US010605895B2

(12) United States Patent
Forrest (10) Patent No.: US 10,605,895 B2
(45) Date of Patent: Mar. 31, 2020

(54) RADAR OPERATION IN A NUCLEAR-SCINTILLATED ENVIRONMENT (71) Applicant: The MITRE Corporation, McLean, VA (US)

(72) Inventor: Eric G. Forrest, Madison, AL (US)

(73) Assignee: The MITRE Corporation, McLean, VA (US)

( * ) Notice: Subject to any disclaimer, the term of this patent is extended or adjusted under 35 U.S.C. 154(b) by 495 days.

(21) Appl. No.: 15/719,113

(22) Filed: Sep. 28, 2017

(65) Prior Publication Data
US 2019/0094335 A1 Mar. 28, 2019

(51) Int. Cl.
G01S 7/35 (2006.01)
G01S 13/34 (2006.01)
G01S 13/58 (2006.01)
G01S 13/00 (2006.01)

(52) U.S. Cl.
CPC ............ G01S 7/354 (2013.01); G01S 13/343 (2013.01); G01S 13/584 (2013.01)

(58) Field of Classification Search
CPC ...... G01S 7/354; G01S 13/584; G01S 13/343; G01S 7/35; G01S 7/38; G01S 7/025; G01S 13/345; G01S 13/28; G01S 13/282; G01S 13/286; G01S 13/288; G01N 23/221
USPC .................................................. 342/128–133
See application file for complete search history.

(56) References Cited

U.S. PATENT DOCUMENTS 3,127,608 A * 3/1964 Eldredge ................... G01S 7/38
342/2
3,720,950 A * 3/1973 Vehrs, Jr. ............... G01S 13/288
342/162
4,072,944 A 2/1978 Bianco et al.
4,309,703 A * 1/1982 Blahut .................. G01S 13/286
342/132
4,320,298 A * 3/1982 Buford, Jr. ........... G01N 23/221
250/358.1
(Continued)

OTHER PUBLICATIONS

S. A. Elgamel et al., "Radar Matched Filtering using the Fractional Fourier Transform"; paper published in the proceedings of "Sensor Signal Processing for Defence (SSPD 2010)"; added to IEEE Xplore on Apr. 30, 2012; INSPEC Accession No. 12570655. (Year: 2012).*

(Continued)

Primary Examiner — Bernarr E Gregory
(74) Attorney, Agent, or Firm — Morrison & Foerster LLP (57) ABSTRACT The present disclosure relates to enabling a radar system relates to identify airborne and spaceborne objects in a nuclear-scintillated environment. In some embodiments, the radar system transmits a plurality of narrowband signals corresponding to a plurality of consecutive segments of a linear frequency modulated (LFM) waveform. The radar system receives a plurality of echo signals corresponding to the plurality of narrowband signals being reflected from an airborne or spaceborne object. Upon processing the plurality of echo signals to generate a plurality of waveform segments, the radar system combines the plurality of waveform segments to produce a composite waveform. Then, the radar system applies a matched filter to the composite waveform using the LFM waveform to identify the airborne or spaceborne object.

22 Claims, 6 Drawing Sheets (56) References Cited

U.S. PATENT DOCUMENTS

| | | | |
|---|---|---|---|
| 4,404,562 A * | 9/1983 | Kretschmer, Jr. | G01S 13/282 342/132 |
| 4,683,474 A | 7/1987 | Randig | |
| 4,817,495 A | 4/1989 | Drobot | |
| 4,894,660 A * | 1/1990 | Thomson | G01S 13/28 342/129 |
| 5,172,118 A | 12/1992 | Peregrim et al. | |
| 6,075,480 A | 6/2000 | Deliberis, Jr. | |
| 6,861,976 B2 | 3/2005 | Budic | |
| 8,026,843 B2 * | 9/2011 | Winkler | G01S 13/345 342/109 |
| 8,390,506 B2 * | 3/2013 | Focke | G01S 13/345 342/112 |
| 8,718,119 B2 | 5/2014 | Manzi | |
| 8,823,580 B2 * | 9/2014 | Gross | G01S 7/35 342/109 |
| 8,823,581 B2 * | 9/2014 | Mostov | G01S 7/025 342/118 |
| 9,024,809 B2 * | 5/2015 | Testar | G01S 7/35 342/109 |

OTHER PUBLICATIONS

Doughty, Shaun Raymond (2008) "Development and Performance Evaluation of a Multistatic Radar System," thesis submitted to University of London, Department of Electronic and Electrical Engineering; 213 pages.

Li, Yanpeng et al. (2016) "Performance Evaluation of Target Detection with a Near-Space Vehicle-Borne Radar in Blackout Condition," Sensors 16,64; doi:10.3390/s16010064; 14 pages.

* cited by examiner

RADAR OPERATION IN A NUCLEAR-SCINTILLATED ENVIRONMENT

FIELD

The present disclosure relates to operating a radar system in a nuclear-scintillated environment and more specifically to generating and analyzing radar signals propagating through the nuclear-scintillated environment.

BACKGROUND

In the aftermath of high-altitude nuclear tests conducted by the United States, e.g., in the Starfish Prime test performed on Jul. 9, 1962, researchers noticed the formation of a nuclear fireball that disrupted all sorts of communications including both one-way and two-way communications. This disruption is referred to as a fireball blackout, also known as nuclear blackout or radar blackout, because the nuclear fireball contains highly ionized plasma spread over large areas, e.g., hundreds of miles, that strongly refract radio waves to render communication systems inoperable.

This blackout effect may be particularly concerning for military systems such as anti-ballistic missile (ABM) systems that rely on radar technology. In typical operation, an ABM system implements a radar that transmits signals via radio waves. Upon encountering an object, the radio waves are scattered by the object and reflected to the radar system as echo signals that are analyzed by the radar to detect and identify the object as, e.g., an incoming missile. In a nuclear-scintillated environment, the plasma in the nuclear fireball causes radar signals to be so heavily refracted that radar systems cannot track and identify objects. Even as the plasma cloud cools and dissipates over a period of minutes, the radar signals may still be so attenuated and distorted as to render ABM systems inoperable. Therefore, in this blackout period, the efficacy of ABM systems is reduced as ABM systems cannot reliably detect, track and identify incoming missiles.

SUMMARY

In some embodiments, a method performed by a radar system to identify airborne and spaceborne objects in a nuclear-scintillated environment, comprises: transmitting a plurality of narrowband signals corresponding to a plurality of consecutive segments of a linear frequency modulated (LFM) waveform; receiving a plurality of echo signals corresponding to the plurality of narrowband signals being reflected from an airborne or spaceborne object; processing the plurality of echo signals to generate a plurality of waveform segments; combining the plurality of waveform segments to produce a composite waveform; and applying a matched filter to the composite waveform using the LFM waveform to identify the airborne or spaceborne object.

In some embodiments, a system for detecting airborne and spaceborne objects in a nuclear-scintillated environment, comprises: a transmitter configured to transmit a plurality of narrowband signals corresponding to a plurality of consecutive segments of a linear frequency modulated (LFM) waveform; a receiver configured to receive a plurality of echo signals corresponding to the plurality of narrowband signals being reflected from an airborne or spaceborne object; one or more processors; memory; and one or more programs, wherein the one or more programs are stored in the memory and configured to be executed by the one or more processors, the one or more programs including instructions for: processing the plurality of echo signals to generate a plurality of waveform segments, combining the plurality of waveform segments to produce a composite waveform, and applying a matched filter to the composite waveform based on the LFM waveform to identify the airborne or spaceborne object.

DETAILED DESCRIPTION

As discussed above, a plasma cloud is formed in the aftermath of a high-altitude nuclear explosion. The cloud is associated with a plasma frequency that can be in the range of 900-2800 MHz or higher depending on an electron density of the plasma cloud. In contrast, under normal ionospheric conditions, the plasma frequency is in the range of 0.9-9.0 MHz. The change in plasma frequency may significantly impact amplitudes and phases of radio waves, including radar signals, propagating through the disturbed nuclear environment. The following disclosure may refer to this propagation path of a radar signal as a nuclear-scintillated propagation channel.

As would be understood by a person skilled in the art, the nuclear-scintillated propagation channel exhibits Gaussian characteristics and can be modeled using the Rayleigh fading and Wide-Sense Stationary and Uncorrelated Scatters (WSSUS) models. As a result, according to some embodiments, the nuclear-scintillated propagation channel can be modeled by the Spaced-Frequency, Spaced-Time Correlation Function, which allows the nuclear-scintillated propagation channel to be characterized by two parameters, Correlation Time $(\Delta t)_c$, and Correlation Bandwidth $(\Delta f)_c$. In some embodiments, the Correlation Bandwidth renders the nuclear-scintillated propagation channel to be Frequency-Selective, as a radar wave that has spectral components that exceed the Correlation Bandwidth can be severely distorted when propagating in this channel. In some embodiments, when the radar waveform has a time extent greater than the Correlation Time, fading occurs during the interval as different, random attenuation and phase shifts are applied by the propagation channel.

Figure 1:
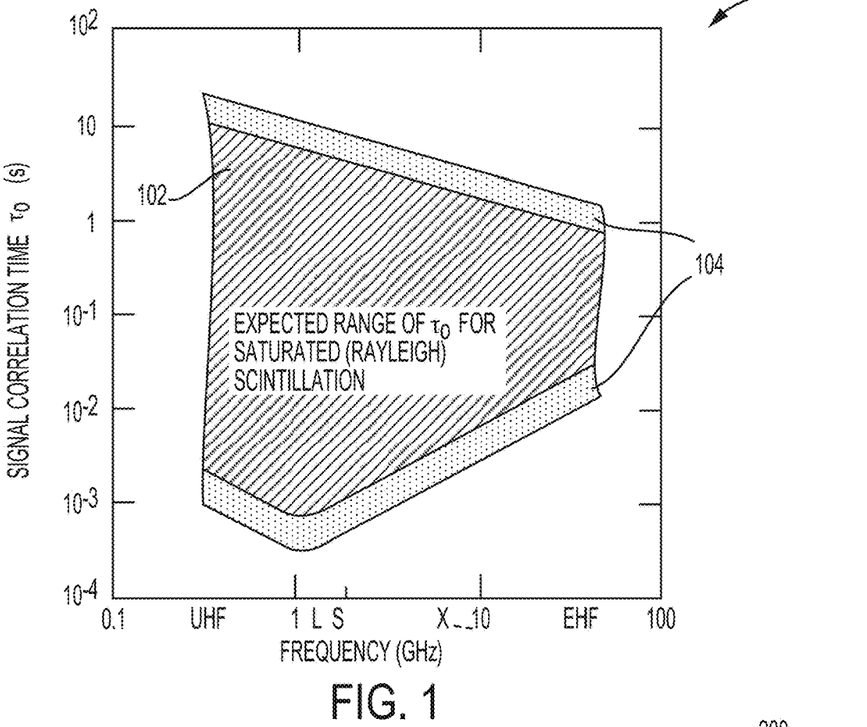
FIG. 1 is a graph that shows a relationship between a correlation time and a carrier frequency of a radar signal propagating in a nuclear-scintillated environment, according to some embodiments.
Figure 2:
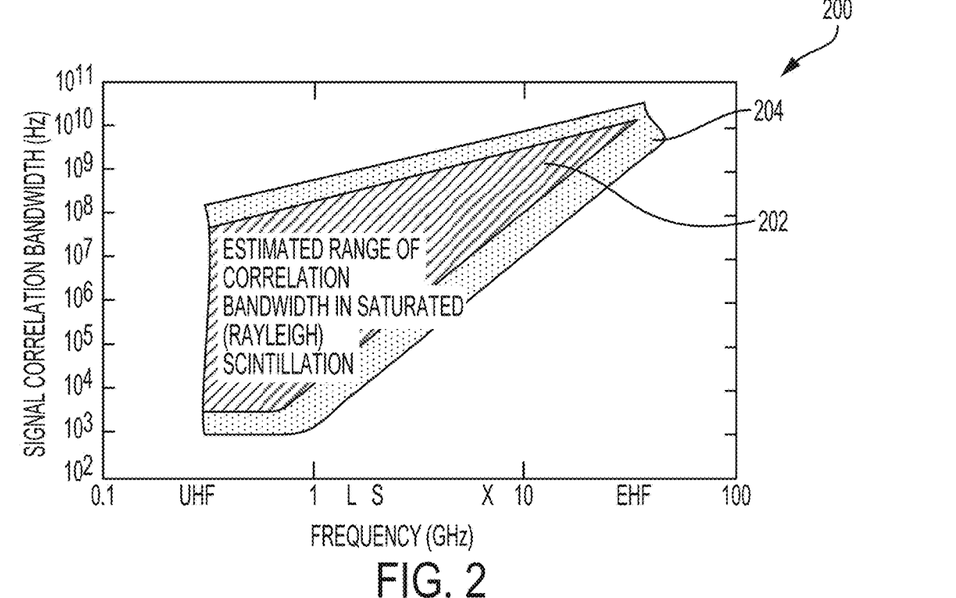
FIG. 2 is a graph that shows a relationship between a correlation bandwidth and a carrier frequency of a radar wave propagating in a nuclear-scintillated environment, according to some embodiments.

In some embodiments, possible values for the Correlation Bandwidth and the Correlation Time can be statistically simulated using Maxwell's equations. For example, Maxwell's equations can provide a parabolic wave equation of a specific realization of a random electron density distribution in a nuclear-scintillated environment. To statistically simulate possible values, the parabolic wave equation can be used to derive a two-position, two-frequency, two-time mutual coherence function of the electric field. Solving the function may provide a description of the second-order statistics of the propagation, including values for Correlation Time and Correlation Bandwidth. FIG. 1 is a graph 100 that shows a relationship between a Correlation Time and a carrier frequency of a radar signal propagating in a nuclear-scintillated environment, according to some embodiments. Graph 100 shows a range 102 of possible correlation times at a specific frequency as statistically simulated according to Maxwell's equations discussed above. Range 102 shows simulated values within one standard deviation, i.e., a sigma value, and range 104 shows simulated values within two standard deviations, i.e., a two sigma value. FIG. 2 is a graph that shows a relationship between a Correlation Bandwidth and a carrier frequency of a radar wave propagating in a nuclear-scintillated environment, according to some embodiments. Graph 200 shows a range 202 of possible correlation bandwidths at a specific frequency as statistically simulated according to Maxwell's equations discussed above. Range 202 shows simulated values within one standard deviation, i.e., a sigma value, and range 204 shows simulated values within two standard deviations, i.e., a two sigma value. As shown in graphs 100 and 200, the Correlation Time and the Correlation Bandwidth may each vary greatly depending on the radio frequency of the radar signal. In some embodiments, the cause of the variation may be attributed to the plasma frequency induced with a nuclear detonation. As observed from past detonations resulting in plasma frequencies ranging from 900-2800 MHz, the plasma frequency can be affected by several factors including detonation yield, detonation altitude, and the latitude of the detonation.

In some embodiments, as can be observed in graphs 100 and 200, selecting a higher radio frequency for transmitting radio signals can increase both the Correlation Time and the Correlation Bandwidth. For example, choosing a carrier frequency of 10 GHz for the radar signal may impose a Correlation Time of at least 10 ms (i.e., the lower end of the possible range of correlation times) and a Correlation Bandwidth of at least 25 MHz (i.e., the lower end of the possible range of correlation bandwidths). However, the Correlation Bandwidth of 25 MHz imposed on a radar signal may severely limit the range resolution of a radar system.

Figure 3:
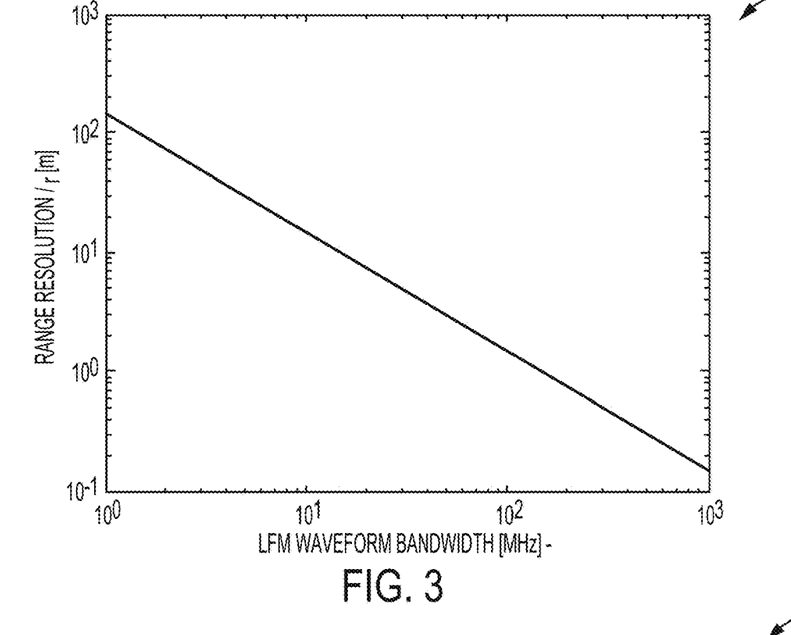
FIG. 3 is a graph that shows a relationship between a range resolution of a radar system and a radar waveform bandwidth, according to some embodiments.

FIG. 3 is a graph 300 that shows a relationship between a range resolution of a radar system and a radar waveform bandwidth, according to some embodiments. In some embodiments, the radar waveform bandwidth is for a Linear Frequency Modulated (LFM) waveform commonly used in radar systems. In some embodiments, graph 300 can be generated based on the following equation: resolution=speed of light/(2*bandwidth). As shown in graph 300, while selecting a carrier frequency of 10 GHz may mitigate the distortion effects in a nuclear-scintillated environment, the associated Correlation Bandwidth of 25 MHz (as discussed above) may impose a range resolution of 6 meters. This range resolution may be unacceptable for modern radar systems as finer granularity range resolution may be needed to more accurately detect a location of an airborne or spaceborne object (e.g., a ballistic missile) and to identify the airborne or spaceborne object. In some embodiments, a range resolution of at least 1.5 meters may be required, which increases the radar waveform bandwidth to 100 MHz. However, as discussed with respect to FIG. 2, at 10 GHz, a bandwidth of 100 MHz would render the radar system inoperable since 100 MHz vastly exceeds the Correlation Bandwidth of 25 MHz and leads to radar signals that are too distorted.

Figure 4:
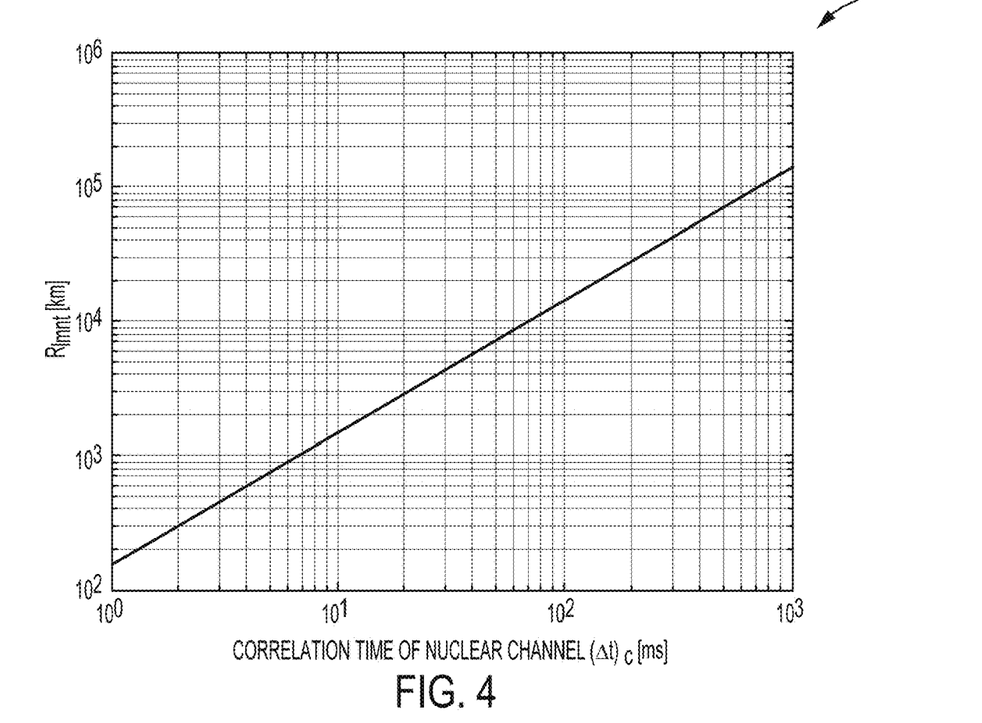
FIG. 4 is a graph that shows a relationship between an operating range limit of a radar system and a correlation time for a radar wave propagating a nuclear-scintillated environment, according to some embodiments.

FIG. 4 is a graph 400 that shows a relationship between an operating range limit of a radar system and a Correlation Time for a radar wave propagating a nuclear-scintillated environment, according to some embodiments. The range limit is a factor to consider while operating the radar system in a nuclear-scintillated environment. Graph 400 can be represented by $R_{limit}=c(\Delta t)_c/2$, where c is the speed of light. In some embodiments, as shown in graph 400, selecting any carrier frequency for the radar waveform that exceeds the plasma frequency (e.g., 2.8 GHz) may be insufficient. For example, as shown in graph 100 of FIG. 1, selecting a carrier frequency in the S-band (2-4 GHz) results in a Correlation Time of approximately 1 ms. Further, as shown in graph 400, a Correlation Time of 1 ms may limit an operating range of the radar system to 150 km. Given the short operating range, the radar system may not have enough time to identify and engage a ballistic missile (i.e., an example of airborne or spaceborne objects) especially since the ballistic missile may be travelling at high speeds, e.g., exceeding 5000 m/s. In some embodiments, selecting a carrier frequency in the X-band (e.g., 10 GHz) or above can provide a large enough operation range. For example, graph 400 indicates that a correlation bandwidth of 10 ms (which corresponds to a carrier frequency of 10 GHz) relates to a range of 1500 km, which extends the operating range of the system.

Embodiments described herein provide methods, systems, and computer-program products that enable a radar system to identify airborne and spaceborne objects in a nuclear-scintillated environment. As will be described below, these embodiments operate within the Correlation Time and the Correlation Bandwidth constraints described with respect to FIGS. 1 and 2, to mitigate the distortion effects caused by a nuclear detonation on radar signals. Further, with respect to requirements of radar systems described with respect to FIGS. 3 and 4, these embodiments provide granular range resolution and long operating range desirous for radar systems such as those used in anti-ballistic missile (ABM) systems.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include processing steps and instructions described herein in the form of an algorithm. It should be noted that the processing steps and instructions of the present disclosure could be embodied in software, firmware, or hardware, and when embodied in software, could be downloaded to reside on and be operated from different platforms used by a variety of operating systems.

Figure 5:
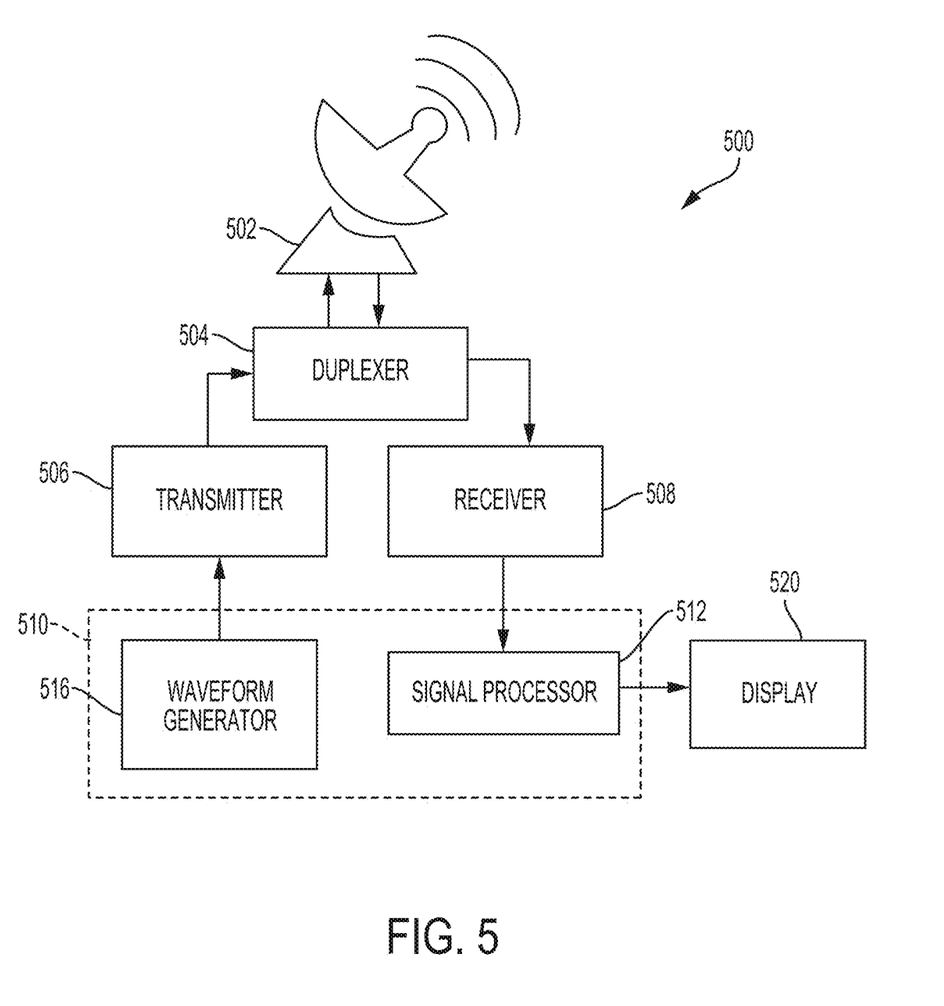
FIG. 5 is a block diagram illustrates a radar system for identifying airborne and spaceborne objects in a nuclear-scintillated environment, according to some embodiments.

FIG. 5 is a block diagram illustrating a radar system 500 for identifying airborne and spaceborne objects in a nuclear-scintillated environment, according to some embodiments. Radar system 500 includes antenna 502, duplexer 504, transmitter 506, receiver 508, computational elements 510, and display 520. In some embodiments, computational components 510 include waveform generator 516 and signal processor 512. In some embodiments, one or more of computational components 510 may be implemented as software operating on a general-purpose microprocessor or a standard computer. To improve processing speed, one or more of computational components 510 may be implemented as hardware, software, or a combination thereof on a digital signal processor (DSP), an application specific integrated circuit (ASIC), or a field-programmable gate array (FPGA), according to some embodiments.

Antenna 502 is an electrical device that converts electrical power into electromagnetic waves and vice versa. In some embodiments, antenna 502 may be constructed as a parabolic antenna, a waveguide antenna, or a phased array antenna. For example, FIG. 5 shows antenna 502 as a parabolic antenna. In general, antenna 502 transmits radar signals, i.e., radio waves having specific properties, in one or more predetermined directions. The radar signals are scattered upon contacting an airborne or spaceborne object and reflected as echo signals that are received by antenna 502. Upon receipt of the echo signals, radar system 500 may analyze the echo signals with respect to the transmitted radar signals to detect, track and identify the airborne or spaceborne object. For example, radar system 500 may identify the airborne or spaceborne object as a ballistic missile.

Duplexer 504 is an electronic switch that permits bi-directional communications over a single path. As shown in FIG. 5, radar system 500 includes duplexer 504 that can serve as a switch that connects antenna 502 to either transmitter 506 or receiver 508 depending on whether antenna 502 is being controlled to transmit or receive radio waves, respectively. In some embodiments, duplexer 504 may be constructed as a hybrid-ring duplexer, e.g., using ferrite circulators, or as a resonant cavity coaxial or waveguide systems, e.g., PIN diodes.

Waveform generator 516 is an electrical device that generates one or more radar waveforms having specific properties that enable radar system 500 to detect and identify an airborne or spaceborne object by analyzing received echo signals corresponding to the one or more radar waveforms transmitted as radar signals via antenna 502. In some embodiments, the one or more radar waveforms can be pre-stored as a series of predetermined values in memory, e.g., PROM. Waveform generator 516 can include circuitry, e.g., flip-flops, counters, etc., to generate the radar waveforms based on the stored values. Waveform generator 516 sends the one or more generated radar waveforms to transmitter 506. In some embodiments, the functionality of waveform generator 516 may be implemented within transmitter 506.

In some embodiments, to generate radar signals useful for enabling detection and identification of airborne or spaceborne objects, waveform generator 116 generates the one or more radar waveforms based on a wideband linear frequency modulated (LFM) waveform. In some embodiments, one or more periods of the LFM waveform may be stored in a memory of waveform generator 516. An LFM waveform employs a quadratic phase over a duration of a pulse ($\tau_{pLFM}$). Over the period $-\tau_{pLFM}/2 \leq t \leq \tau_{pLFM}/2$, the quadratic phase starts at $\pi\gamma\tau_{pLFM}^2/4$, transitions to 0, and returns to $\pi\gamma\tau_{pLFM}^2/4$. In some embodiments, the LFM baseband waveform ($s_{LFM}(t)$) that is stored can be represented according to the following equation:

$$s_{LFM}(t) = rect\left[\frac{t}{\tau_{pLFM}}\right] \exp(j\pi\gamma t^2) \quad \text{(Equation 1)}$$

where $\gamma$ is a slope of the LFM waveform and $rect(t/\tau_{pLFM})$ is a rectangle function over the interval $-\tau_{pLFM}/2 \leq t \leq \tau_{pLFM}/2$. The LFM slope may assume positive or negative values. Because a linear frequency of the LFM waveform starts at $-\pi\gamma\tau_{pLFM}$ and ends at $\pi\gamma\tau_{pLFM}$, for a total extent of $2\pi\gamma\tau_{pLFM}$, the LFM waveform has a bandwidth $\beta_{LFM} = \gamma\tau_{pLFM}$ (Hz).

As discussed above with respect to FIG. 3, to satisfy a range resolution that is sufficiently granular to enable identification of an airborne or spaceborne object, the LFM waveform used by waveform generator 516 needs to have a wide bandwidth $\beta_{LFM}$, e.g., greater than 100 MHz. As described in the present disclosure herein, the term wideband may refer to a bandwidth that enables discrimination and identification of airborne and spaceborne objects. In some embodiments, the term wideband bandwidth refers to a bandwidth of at least 100 MHz. In some embodiments, the LFM waveform generated by waveform generator 516 can have a 500 MHz bandwidth to enable granular range resolution useful in discrimination and identification of airborne and spaceborne objects such as a ballistic missile. The 500 MHz bandwidth is greater than 100 MHz and therefore considered wideband as described in the present disclosure.

In some embodiments, as described with respect to FIG. 1, the LFM waveform may need to be transmitted on a carrier frequency in at least the X-band, e.g., at 10 GHz, which imposes a Correlation Bandwidth $(\Delta f)_c$ of 25 MHz. However, a radar signal carrying the wideband LFM waveform having, for example, a bandwidth of 100 MHz exceeding the Correlation Bandwidth, will become too heavily refracted for radar system 100 to process as the radar signal travels in a nuclear-scintillated channel. To address this problem, waveform generator 116 generates a plurality of narrowband waveforms to be transmitted as a plurality of corresponding narrowband signals via antenna 502, according to some embodiments. As described in the present disclosure herein, the term narrowband refers to a bandwidth less than the Correlation Bandwidth for a specific carrier frequency. For example, for a carrier frequency of 10 GHz, narrowband refers to a bandwidth less than 25 MHz, which is the Correlation Bandwidth associated with the carrier frequency of 10 GHz.

In some embodiments, the plurality of narrowband waveforms generated by waveform generator 516 corresponds to sequential segments of the LFM waveform $s_{LFM}(t)$ described above in (Equation 1). Waveform generator 516 can generate a predetermined number, $N_s$, of narrowband waveforms where each of the narrowband waveforms has a pulse width of $\tau_p$ and a narrowband bandwidth of $\beta3_{NB}=\gamma\tau_p$ such that $\tau_{pLFM}=N_s\tau_p$ and consequently, $\beta_{LFM}=\gamma N_s\tau_p$ (Hz). In some embodiments, to enable radar system 100 to detect individual echo signals corresponding to radar signals being reflected from airborne or spaceborne objects, the pulse width $\tau_p$ can be a value such that the sum of the pulse widths $(N_s*\tau_p)$ of each of the plurality of narrowband waveforms does not exceed the Correlation Time for the specific carrier frequency being used to modulate each of the plurality of narrowband waveforms. Further, based on the value of the pulse width $\tau_p$, the LFM slope $\gamma$ can be a value that satisfies $\beta_{NB}=\gamma\tau_p$ where each narrowband waveform has a bandwidth $\beta_{NB}$ that is supported by the nuclear-disturbed channel, i.e., within the Correlation Bandwidth (i.e. $\beta_{NB} \leq (\Delta f)_c$).

Accordingly, in some embodiments, an $n^{th}$ segment $s_{LFM\_n}(t)$ of the predetermined number $\theta_s$ of narrowband waveforms can be represented according to the following equation:

$$s_{LFM\_n}(t) = rect\left[\frac{t-\theta_n}{\tau_p}\right]\exp(j\pi\gamma t^2) \quad \text{(Equation 2)}$$

where the $n^{th}$ segment $s_{LFM\_n}(t)$ of the wideband LFM waveform $s_{LFM}(t)$ is offset in time by an amount $\theta_n$, over a reduced duration $\tau_p$. As discussed above, in some embodiments, the LFM waveform (i.e., (Equation 1)) can be stored in memory, in which case the $n^{th}$ segment $s_{LFM\_n}(t)$ represents a portion of the LFM waveform being stored in memory.

Transmitter 506 produces short-duration high-power radio frequency (RF) pulses of energy that are converted to radar signals by antenna 502. In some embodiments, transmitter 506 performs modulation and power amplification on the one or more radar waveforms generated by waveform generator 516. For example, transmitter 506 may amplify radar waveforms using an amplifier, a klystron, or a solid-state-amplifier. In some embodiments, transmitter 506 modulates the one or more radar waveforms by a carrier frequency to generate radar signals that can operate, e.g., propagate, in a nuclear-scintillated environment.

In some embodiments, under normal operation, the LFM waveform $s_{LFM}(t)$ generated by waveform generator 516 may be routed to transmitter 506, which modulate $s_{LFM}(t)$ with a carrier frequency $f_c$, to generate an LFM signal s(t) to be transmitted by antenna 502. The LFM signal s(t) may be represented according to the following equation:

$$s(t) = \quad \text{(Equation 3)}$$
$$s_{LFM}(t)\exp(j2\pi f_c t) = rect\left[\frac{t}{N_s\tau_p}\right]\exp(j\pi\gamma t^2)\exp(j2\pi f_c t).$$

As discussed above, a plasma cloud is formed in the aftermath of a nuclear explosion. The cloud is associated with a plasma frequency that can be in the range of 900-2800 MHz or higher depending on an electron density of the cloud. Additionally, as described with respect to FIGS. 1 and 4, selecting a carrier frequency in the S-band (2-4 GHz) just above the plasma frequency of the plasma cloud may not provide a sufficient operating range for the radar system. Accordingly, in some embodiments, transmitter 506 performs modulation using a carrier frequency that is at least in the X-band (8-12 GHz), e.g., 10 GHz. In some embodiments, the carrier frequency can be selected from the following radar bands: X-band (8-12 GHz), Ku-band (12-18 GHz), K-band (18-27 GHz), Ka-band (27-40 GHz), or W-band (75-110 GHz).

In some embodiments, as discussed above with respect to waveform generator 516, to satisfy a granular range resolution, waveform generator 516 may send a plurality of narrowband waveforms (e.g., a predetermined number, $N_s$) of segments of an LFM waveform to transmitter 506 for modulation. Accordingly, transmitter 506 can modulate an $n^{th}$ narrowband waveform $s_{LFM\_n}(t)$ by the carrier frequency $f_c$ to generate a narrowband signal $s_n(t)$ for transmission as a radar signal. In some embodiments, the narrowband signal $s_n(t)$ being modulated by the carrier frequency $f_c$ can be represented by the following equation:

$$s_n(t) = \quad \text{(Equation 4)}$$
$$s_{LFM\_n}(t)\exp(j2\pi f_c t) = rect\left[\frac{t-\theta_n}{\tau_p}\right]\exp(j\pi\gamma t^2)\exp(j2\pi f_c t).$$

In some embodiments, because an LFM waveform is defined as a sinusoidal wave that increases in frequency linearly over time, processing performed by waveform generator 516 and transmitter 106 can be simplified. In these embodiments, waveform generator 516 can store a base LFM waveform $s'_{LFM}(t)$ that corresponds to a smaller portion of the LFM waveform $s_{LFM}(t)$. For example, the baseband LFM waveform $s'_{LFM}(t)$ being stored may be represented by the following equation:

$$s'_{LFM}(t) = rect\left[\frac{t}{\tau_p}\right]\exp(j\pi\gamma t^2) \quad \text{(Equation 5)}$$

Then, in some embodiments, transmitter 506 can be configured to transmit an $n^{th}$ narrowband waveform $s'_n(t)$ that is mathematically equivalent to $s_n(t)$ by modulating the base LFM waveform $s'_{LFM}(t)$ by a carrier frequency $f_c$ modified by a frequency adjustment $f_n$. In some embodiments, the frequency adjustment $f_n$ can be determined by transmitter 506 based on the LFM slope $\gamma$ and the time offset $\theta_n$ associated with the $n^{th}$ narrowband waveform, i.e., $s'_n(t)$. For example, the frequency adjustment $f_n$ may be computed by multiplying the LFM slope $\gamma$ by the time offset $\theta_n$. In some embodiments, an $n^{th}$ narrowband signal $s'_n(t)$ being transmitted by transmitter 506 at a specific instance in time $\psi$ represented by the following equation:

$$s'_n(t) = s'_{LFM}(t-\psi)\exp(j2\pi(f_c+f_n)t) \quad \text{(Equation 6)}$$
$$= rect\left[\frac{t-\psi}{\tau_p}\right]\exp(j\pi\gamma(t-\psi)^2)\exp$$
$$(j2\pi(f_c+f_n)t).$$

Receiver 508 amplifies and demodulates one or more RF signals received by antenna 502. Then, receiver 508 may send the one or more demodulated RF signals to signal processor 512 for further processing. As described above, the one or more RF signals may correspond to echo signals that result from narrowband radar signals being scattered by an airborne or spaceborne object. Accordingly, for purposes of enhanced clarity, the present disclosure may refer to these one or more RF signals processed by receiver 508 as echo signals where an $n^{th}$ echo signal $\zeta'(t)_n$ corresponds to the $n^{th}$ narrowband signal $s'_n(t)$ being transmitted by transmitter 506.

In some embodiments, the $n^{th}$ echo signal $\zeta'(t)_n$ received by receiver 508 is a distorted, time-scaled, and delayed version of the $n^{th}$ narrowband signal $s'_n(t)$. Due to the nuclear-scintillated environment, the narrowband signal $s'_n(t)$ undergoes a distortion, i.e., a complex modulation $A_n$, while propagating to and from the object located at a point $R_0$ in space. In some embodiments, to reduce the additional processing required in processing an $n^{th}$ echo signal distorted by a complex modulation $A_n$, radar system 500 may be configured to transmit the corresponding $n^{th}$ narrowband signal and receive the $n^{th}$ echo signal within the Correlation Time. Because of operating within the Correlation Time, the complex modulation $A_n$ remains the same value for each of the $n^{th}$ received echo signal. In some embodiments, to extend the radar operating range, transmitter 506 can be configured to transmit the predetermined number of narrowband signals ($N_s$) consecutively within the Correlation Time without waiting to process energy from the first narrowband signal, e.g., an echo signal.

In some embodiments, because the object (e.g., an airborne or spaceborne object) can be a moving target, the radial range R(t) between radar system 500 and the object can vary significant across a period of time based on a velocity v of the object, i.e., $R(t)=R_0+\hat{v}t$. As a result, due to movement of the object, the narrowband signal $s'_n(t)$ can undergo a time scaling $\alpha$ and a time delay $\tau'_0$ representing the time between a narrowband signal being transmitted and received as an echo signal. In some embodiments, the time scaling is based on the velocity v and the speed of light c, e.g., $\alpha=(c-\hat{v})/(c+\hat{v})$. In some embodiments, time delay $\tau'_0$ represents the time interval between is based on the velocity v, the speed of light c, and the initial point $R_0$ of the object, e.g., $\tau'_0=2R_0/(c-v)=\tau_0/(1-v/c)$ where $\tau_0$ represents the delay for the object fixed at $R_0$. Accordingly, echo signal $\zeta'(t)_n$ may be represented mathematically as $\zeta'(t)_n=A_n*s'_n(\alpha(t-\tau'_0))$ or equivalently represented as:

$$\zeta'_n(t) = A_n rect\left[\frac{\alpha(t-\tau'_0)-\psi}{\tau_p}\right] \quad \text{(Equation 7)}$$
$$\exp(j\pi\gamma(\alpha(t-\tau'_0)-\psi)^2)\exp(j2\pi\alpha(f_c+f_n)(t-\tau'_0)).$$

In some embodiments, to enable radar system 500 to identify and detect the airborne or spaceborne object, receiver 508 can be configured to demodulate the echo signal, e.g., $n^{th}$ echo signal $\zeta'(t)_n$, by an adjusted carrier frequency $(f_c+f_n)$ associated with the narrowband signal, e.g., $n^{th}$ narrowband signal $s'_n$, corresponding to the echo signal. In some embodiments, receiver 508 determines the adjusted carrier frequency based on a position of the $n^{th}$ narrowband waveform $s'_n(t)$ with respect to the LFM waveform used by waveform generator 516 to generate the narrowband waveform $s'_n(t)$. For example, for the echo signal $\zeta'_n(t)$ associated with an $n^{th}$ segment of the LFM waveform, receiver 508 determines the frequency adjustment $f_n$ by multiplying the LFM slope $\gamma$ by the time offset $\theta_n$ associated with the $n^{th}$ segment. In some embodiments, receiver 508 can be configured to retrieve the adjusted carrier frequency or a combination of the base carrier frequency $f_c$ and frequency adjustment $f_n$ used by transmitter 506 to modulate a narrowband waveform corresponding to the echo signal. The demodulation performed by receiver 508 near time $\psi$ can be represented mathematically as $\chi'_n(t)=\zeta'_n(t+\psi)\exp(-j2\pi(f_c+f_n)(t+\psi))$ or equivalently represented as:

$$\chi'_n(t) = \quad \text{(Equation 8)}$$
$$A_n rect\left[\frac{\alpha(t+\psi-\tau'_0)-\psi}{\tau_p}\right]\exp(j\pi\gamma(\alpha(t+\psi-\tau'_0)-\psi)^2)$$
$$\exp(j2\pi\alpha(f_c+f_n)(t+\psi-\tau'_0))\exp(-j2\pi(f_c+f_n)(t+\psi)).$$

In some embodiments, to enable identification of the airborne or spaceborne object, signal processor 512 can be configured to receive and process a plurality of echo signals demodulated by receiver 508 to generate a plurality of waveform segments. Signal processor 512 can be configured to process an $n^{th}$ demodulated echo signal $\chi'_n(t)$ to generate a waveform segment where an $n^{th}$ waveform segment is represented by response signal $\chi''_n$ that corresponds to the $n^{th}$ narrowband signal $s'_{LFM}(t)$. In some embodiments, processing performed by signal processor 512 can include reversing the time-scaling and time delay imposed on the $n^{th}$ narrowband signal $s'_n(t)$ corresponding to the $n^{th}$ demodulated echo signal $X'_n(t)$. In some embodiments, to reverse the time-scaling and time delay, signal processor 512 can be configured to perform one or more time shifts, one or more frequency adjustments, and one or more phase adjustments on each demodulated echo signals.

In some embodiments, signal processor 512 can be configured to time shift the $n^{th}$ demodulated echo signal $\chi'_n(t)$ based on a first time-shift, i.e., a scaled offset $\theta'_n$, and a second time-shift, i.e., a scaled time-shift $\tau'_\psi$. In some embodiments, the first time-shift is based on the segment offset in time $\theta_n$ being scaled by the time scaling $\alpha$ (e.g., $\theta'_n=\theta_n/\alpha$ where $\alpha=(c-\hat{v})/(c+\hat{v})$ and c is the speed of light). In some embodiment, the second time shift is based on the specific instance in time $\psi$ and the time scaling $\alpha$ (e.g., $\tau'_\psi=(\psi/\alpha)(1-\alpha)$ where $\alpha=(c-\hat{v})/(c+\hat{v})$ and c is the speed of light).

In some embodiments, signal processor 512 can apply the first and second time shifts to the demodulated echo signal $\chi'_n(t)$ separately. In other embodiments, signal processor 512 can apply a third time-shift that comprises the first and second time-shifts. In some embodiments, either by applying the first and second time shifts independently or together as the third shift, an $n^{th}$ time-shifted echo signal of the $n^{th}$ demodulated echo signal $\chi'_n(t)$ can be represented according to equation:

$$\chi'_n(t+\tau'_\psi-\theta'_n) = \quad \text{(Equation 8)}$$
$$A_n rect\left[\frac{\alpha(t-\tau'+\tau'_\psi-\theta)}{\tau_p}\right]\exp(j\pi\gamma\alpha^2(t-\tau'+\tau'_\psi-\theta'_n)^2)$$
$$\exp(j2\pi(\alpha-1)(f_c+f_n)(t+\tau'_\psi-\theta'_n))$$
$$\exp(-j2\pi\alpha(f_c+f_n)\tau').$$

where delay time $$\tau' = \tau'_0 + \frac{\psi}{\alpha}(1-\alpha) = \tau'_0 + \tau'_\psi$$

and $\alpha=(c-v)/(c+v)$.

In some embodiments, signal processor 512 can be configured to perform one or more frequency adjustments and one or more phase adjustments on an $n^{th}$ time-shifted echo signal $\chi'_n(t+\tau'_\psi-\theta'_n)$ to generate a corresponding $n^{th}$ waveform segment $\chi''_n(t+\tau'_\psi-\theta'_n)$. In some embodiments, the one or more frequency adjustments is based on a frequency adjustment $f_n$ used in transmitting the $n^{th}$ narrowband signal $s'_n(t)$. For example, signal processor 512 may perform the one or more frequency adjustments by modulating the $n^{th}$ time-shifted echo signal by the frequency adjustment $f_n$ by multiplying $n^{th}$ waveform segment $\chi'_n(t+\tau'_\psi-\theta'_n)$ by the expression exp $(j2\pi f_n t)$.

In some embodiments, signal processor 512 can be configured to perform one or more phase adjustments on an $n^{th}$ time-shifted echo signal $\chi'_n(t+\tau'_\psi-\theta'_n)$ based on: a frequency adjustment $f_n$, a time offset $\theta_n$, a carrier frequency $f_c$, a velocity $\hat{v}$ of the airborne or spaceborne object, a speed of light c, and the specific instance in time $\psi r$. In some embodiments, the one or more phase adjustments includes three phase adjustments: a first phase adjustment based on $f_n$ and $\theta_n$ (e.g., modulating by $\exp(-j\pi f_n \theta_n)$); a second phase adjustment based on $f_c$, $f_n$, $\psi$, c, and $\hat{v}$ (e.g., modulation by $\exp(+j2\pi(f_c+f_n)\tau'_\psi)$ where $$\tau'_\psi = \frac{\psi}{\alpha}(1-\alpha)$$

and $\alpha=(c-\hat{v})/(c+\hat{v})$); and a third phase adjustment based on $f_c$, $f_n$, c, $\hat{v}$, and $\theta_n$ (e.g., modulating by $\exp(+j2\pi(\alpha-1)(f_c+f_n)(\theta'_n))$ where $\alpha=(c-\hat{v})/(c+\hat{v})$ and $\theta'_n=\theta_n/\alpha$).

In some embodiments, signal processor 512 can be configured to apply the one or more time shifts and the three phase adjustments described above with respect to an $n^{th}$ time-shifted echo signal $\chi'_n(t+\tau_\psi-\theta'_n)$ to generate a corresponding $n^{th}$ waveform segment $\chi''_n(t+\tau'_\psi-\theta'_n)$, which can be mathematically represented according to the following equation:

$$\chi''_n(t+\tau'_\psi-\theta'_n)=\exp(j2\pi f_n t)\exp(-j\pi f_n \theta_n)\exp(+j2\pi(f_c+f_n)\tau'_\psi)\exp(+j2\pi(\alpha-1)(f_c+f_n)(\theta'_n))\chi'_n(t+\tau'_\psi-\theta'_n). \quad \text{(Equation 9)}$$

In some embodiments, to speed up the application of the second and third phase adjustments as processed by hardware and/or software of signal processor 512, signal processor 512 can approximate the quantity $(\alpha-1)/\alpha$ as being $-2\hat{v}/c$ because the velocity $\hat{v}$ of the airborne or spaceborne object is very likely to be significantly less than the speed of light c:

$$\frac{\alpha-1}{\alpha} = -\frac{2\hat{v}}{c-\hat{v}} = -\frac{\frac{2\hat{v}}{c}}{1-\frac{\hat{v}}{c}} \approx \frac{-2\hat{v}}{c} \text{ for } \hat{v} \ll c. \quad \text{(Equation 10)}$$

As a result, in some embodiments, the signal processor 512 can apply the second phase adjustment by applying a modulation of $\exp(j4\pi\hat{v}\psi)(f_c+f_n)/c)$ that approximates the modulation of $\exp(+j2\pi(f_c+f_n)\tau'_\psi)$, described above. Similarly, in some embodiments, the signal processor 512 can apply the third phase adjustment by applying a modulation of $\exp(-(j4\pi\hat{v}\theta_n)(f_c+f_n)/c)$ that approximates the modulation of $\exp(+j2\pi(\alpha-1)(f_c+f_n)(\theta'_n))$, described above.

In some embodiments, signal processor 512 combines the plurality of waveform segments to generate a composite waveform that corresponds to the LFM waveform as described with respect to (Equation 3) used to produce and transmit a plurality of narrowband signals corresponding to a plurality of consecutive segments of the LFM waveform. In some embodiments, signal processor 512 applies a Matched Filter to the composite waveform with the LFM waveform as input. A result of the Matched Filter can be used by signal processor 512 to determine whether the airborne or spaceborne object is detected. Further, the result can be used by signal processor 512 to identify the airborne or spaceborne object. For example, the embodiments described herein may enable signal processor 512 to identify the airborne or spaceborne object as a ballistic missile. In some embodiments, information related to the result can be displayed on display 520. Display 520 may be a monitor, a screen, or any device for presenting data.

Figure 6:
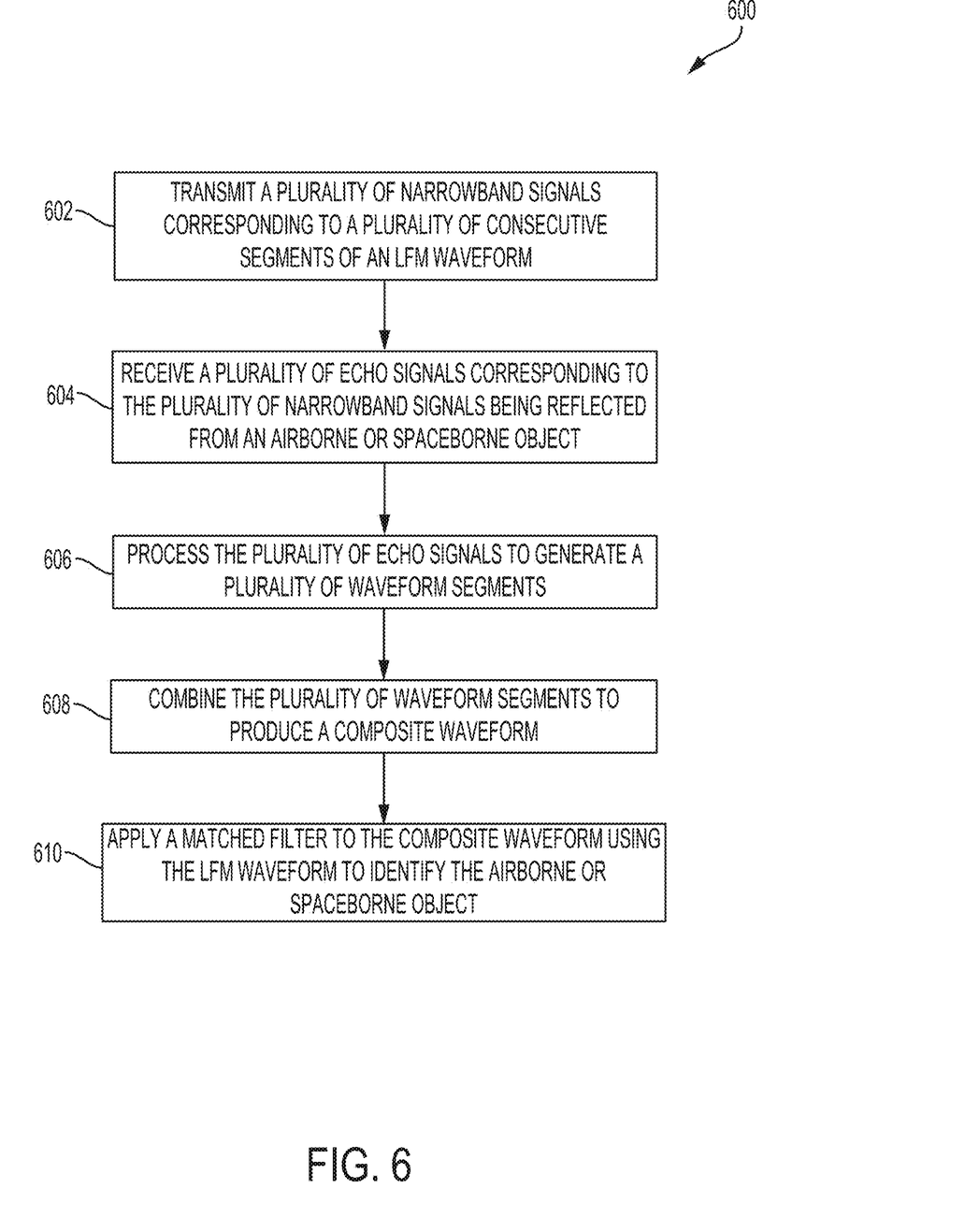
FIG. 6 illustrates a method for identifying airborne and spaceborne objects in a nuclear-scintillated environment, according to some embodiments.

FIG. 6 is a flowchart illustrating a method 600 for identifying airborne or spaceborne objects in a nuclear-scintillated environment, according to some embodiments. In some embodiments, method 600 may be performed by radar system 500 described with respect to FIG. 5.

In step 602, a radar system transmits a plurality of narrowband signals corresponding to a plurality of consecutive segments of an LFM waveform. For example, transmitter 506 of radar system 500 may transmit the plurality of narrowband signals via antenna 502. In some embodiments, the radar system generates a plurality of narrowband waveforms that are processed, e.g., modulated, by a transmitter to generate the plurality of narrowband signals. When a narrowband signal transmitted by the radar system contacts an airborne or spaceborne object, the narrowband signal is reflected towards the radar system as an echo signal.

In step 604, the radar system receives a plurality of echo signals corresponding to the plurality of narrowband signals being reflected from an airborne or spaceborne object. For example, receiver 508 of radar system 500 may receive the plurality of echo signals via antenna 502. In some embodiments, the radar system receives the plurality of echo signals as a sequence of consecutive signals. As described with respect to FIG. 5, the radar system may amplify the plurality of echo signals to enable signal processor 512 to detect and identify the airborne or spaceborne object. In some embodiments, the radar system amplifies the plurality of echo signals sufficiently to detect a pulse envelope of each echo signal and may further amplify the pulses.

In step 606, the radar system processes the plurality of echo signals to generate a plurality of waveform segments. For example, receiver 508 may demodulate each echo signal from the plurality of echo signals based on the position of a corresponding narrowband signal within the LFM waveform described in step 602. In some embodiments, as will be described with respect to method 700 of FIG. 7, the radar system can be configured to perform one or more time shifts, one or more frequency shifts, and one or more phase shifts on the echo signal to generate a corresponding waveform segment.

In step 608, the radar system combines the plurality of waveform segments to produce a composite waveform. For example, signal processor 512 of radar system 500 may combine the plurality of waveform segments. In some embodiments, the radar system combines the plurality of waveform segments by adding the plurality of waveform segments. In some embodiments, the composite waveform corresponds to the LFM waveform from which the plurality of narrowband signals was generated and transmitted in step 602.

In step 610, the radar system applies a matched filter to the composite waveform using the LFM waveform to identify the airborne or spaceborne object. For example, signal processor 512 of radar system 500 may implement the matched filter. In some embodiments, the radar system applies the matched filter by correlating the LFM waveform with the composite waveform to detect a presence of the LFM waveform in the composite waveform. Based on a result of the applied matched filter, the radar system can detect and identify the airborne or spaceborne object. In some embodiments, upon detection and identification of the airborne or spaceborne object, the radar system may present a rendering of the airborne or spaceborne object, e.g., a ballistic missile, on a display such as display 520 of radar system 500.

Figure 7:
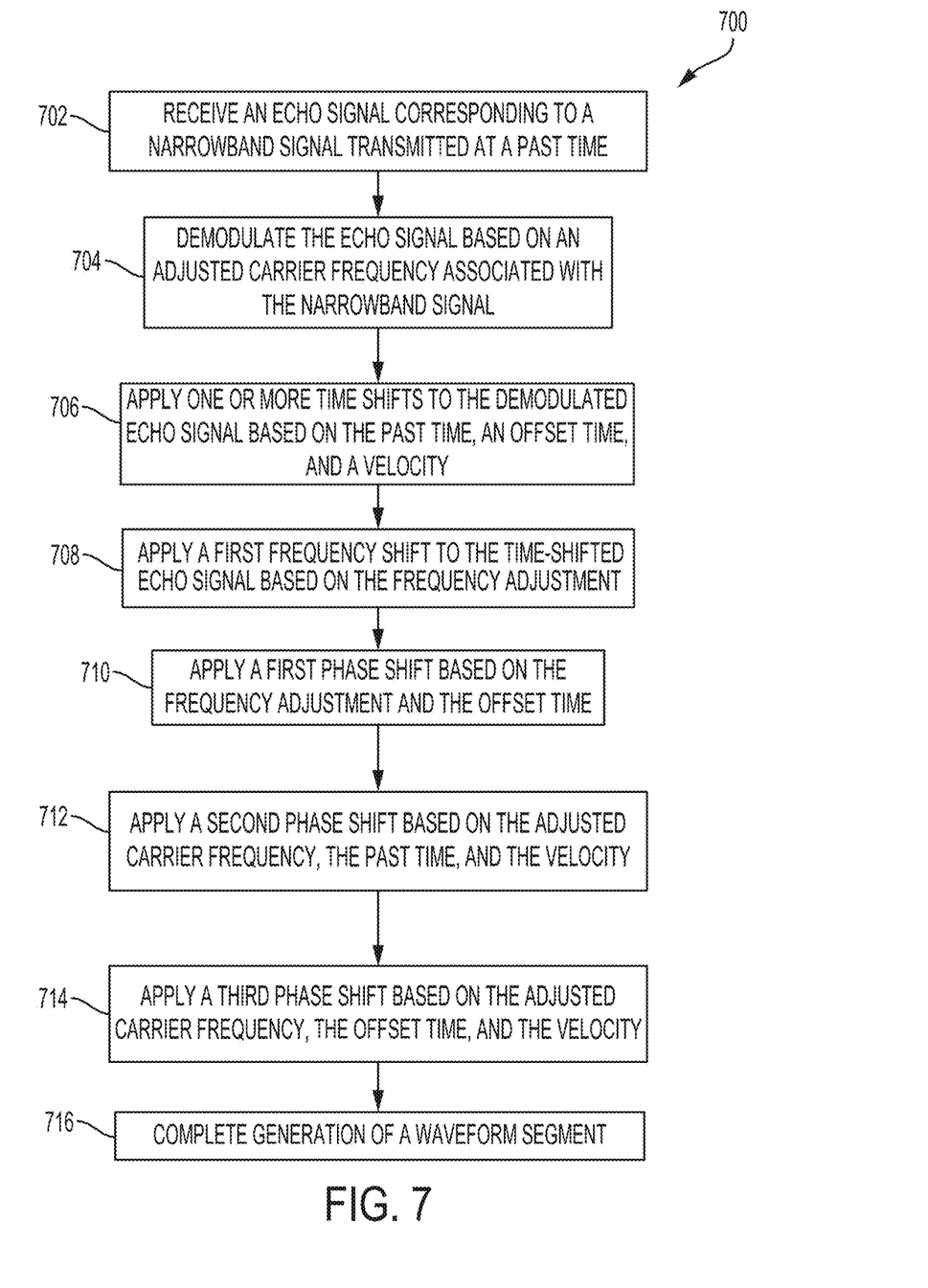
FIG. 7 illustrates a method for processing echo signals in a nuclear-scintillated environment to enable identification of airborne and spaceborne objects, according to some embodiments.

FIG. 7 illustrates a method 700 for processing echo signals in a nuclear-scintillated environment to enable identification of airborne or spaceborne objects, according to some embodiments. In some embodiments, method 700 expands upon the echo processing performed by a radar system in step 606 as described with respect to FIG. 6. In some embodiments, steps 704-714 need not necessarily be performed in the order as specified. For example, steps 708-714 related to applying one or more frequency shifts and one or more phase shifts may be performed in any order. In some embodiments, one or more steps 704-714 can be conducted concurrently. For example, one or more phase shifts corresponding to steps 710-714 can be completed simultaneously.

In step 702, a receiver of the radar system receives an echo signal corresponding to a narrowband signal transmitted at a past time $\psi r$. As described with respect to radar system 500 of FIG. 5 and step 602 of FIG. 6, an $n^{th}$ echo signal $\zeta'_n(t)$ may correspond to an $n^{th}$ segment of an LFM waveform being modulated by a carrier frequency $f_c$ modified by a frequency adjustment $f_n$. In some embodiments, the receiver may receive from a transmitter of the radar system the past time, the carrier frequency, the frequency adjustment, or a combination thereof associated with the narrowband signal.

In step 704, the receiver demodulates the echo signal based on an adjusted carrier frequency associated with the narrowband signal. In some embodiments, the receiver demodulates each echo signal differently depending on the past time and the adjusted carrier frequency associated with that echo signal. In some embodiments, as described with respect to radar system 500 of FIG. 5, the adjusted carrier frequency includes a carrier frequency $f_c$ modified by the frequency adjustment $f_n$. In some embodiments, the receiver determines the frequency adjustment $f_n$ for an $n^{th}$ echo signal $\zeta'_n(t)$ based on an LFM slope $\gamma$ and a time offset $\theta_n$ corresponding to the $n^{th}$ echo signal $\theta'_n(t)$.

In step 706, a signal processor of the radar system applies one or more time shifts to the demodulated echo signal based on the past time, an offset time associated with the echo signal, and a velocity of the airborne or spaceborne object. In some embodiments, the velocity can be estimated by a tracker within the radar system. For example, signal processor 512 in FIG. 5 may apply a first time shift related to the offset time $\theta_n$ and the velocity $\hat{v}$ of the airborne or spaceborne object and apply a second time shift related to the past time $\psi$ and the velocity $\hat{v}$.

In step 708, the signal processor applies a first frequency shift to the time-shifted echo signal based on the frequency adjustment. For example, signal processor 512 in FIG. 5 may apply the first frequency shift by modulating an $n^{th}$ time-shifted echo signal $\chi'_n(t+\tau'_\psi-\theta'_n)$ by the expression $\exp(j2\pi f_n t)$, which includes the frequency adjustment $f_n$.

In step 710, the signal processor applies a first phase shift based on the frequency adjustment and the offset time. For example, signal processor 512 in FIG. 5 may apply the first phase adjustment by modulating the $n^{th}$ time-shifted echo signal $\chi'_n(t+\tau'_\psi-\theta'_n)$ by the expression $\exp(-j\pi f_n \theta_n)$, which includes the phase adjustment $f_n$ and the offset time $\theta_n$.

In step 712, the signal processor applies a second phase shift based on the adjusted carrier frequency, the past time, and the velocity of the airborne or spaceborne object. In some embodiments, the radar system can be configured to estimate the velocity. In some embodiments, as described with respect to FIG. 5, the signal processor may apply the second phase adjustment by modulating the $n^{th}$ time-shifted echo signal $\chi'_n(t+\tau'_\psi-\theta'_n)$ by the expression $\exp(+j2\pi(f_c+f_n)\tau'_\psi)$, which includes the adjusted carrier frequency $(f_c+f_n)$ and a scaled time-shift $\tau'_\psi$ associated with the past time and the velocity of the airborne or spaceborne object.

In step 714, the signal processor applies a third phase shift based on the adjusted carrier frequency, the offset time, and the velocity of the airborne or spaceborne object. In some embodiments, the radar system can be configured to estimate the speed. In some embodiments, as described with respect to FIG. 5, the signal processor may implement the third phase adjustment by modulating the $n^{th}$ time-shifted echo signal $\chi'_n(t+\tau'_\psi-\theta'_n)$ by the expression $\exp(+j2\pi(\alpha-1)(f_c+f_n)(\theta'_n))$, which includes: the adjusted carrier frequency $(f_c+f_n)$, a time scaling $\alpha$ associated with the velocity, and a scaled offset time $\theta'_n$ related to the offset time $\theta_n$ and the speed.

In step 716, the signal processor completes generation of a waveform segment based on the echo signal received in step 702. In some embodiments, the resulting waveform segment corresponds to an output of the echo signal processing described with respect to step 606 of FIG. 6.

Figure 8:
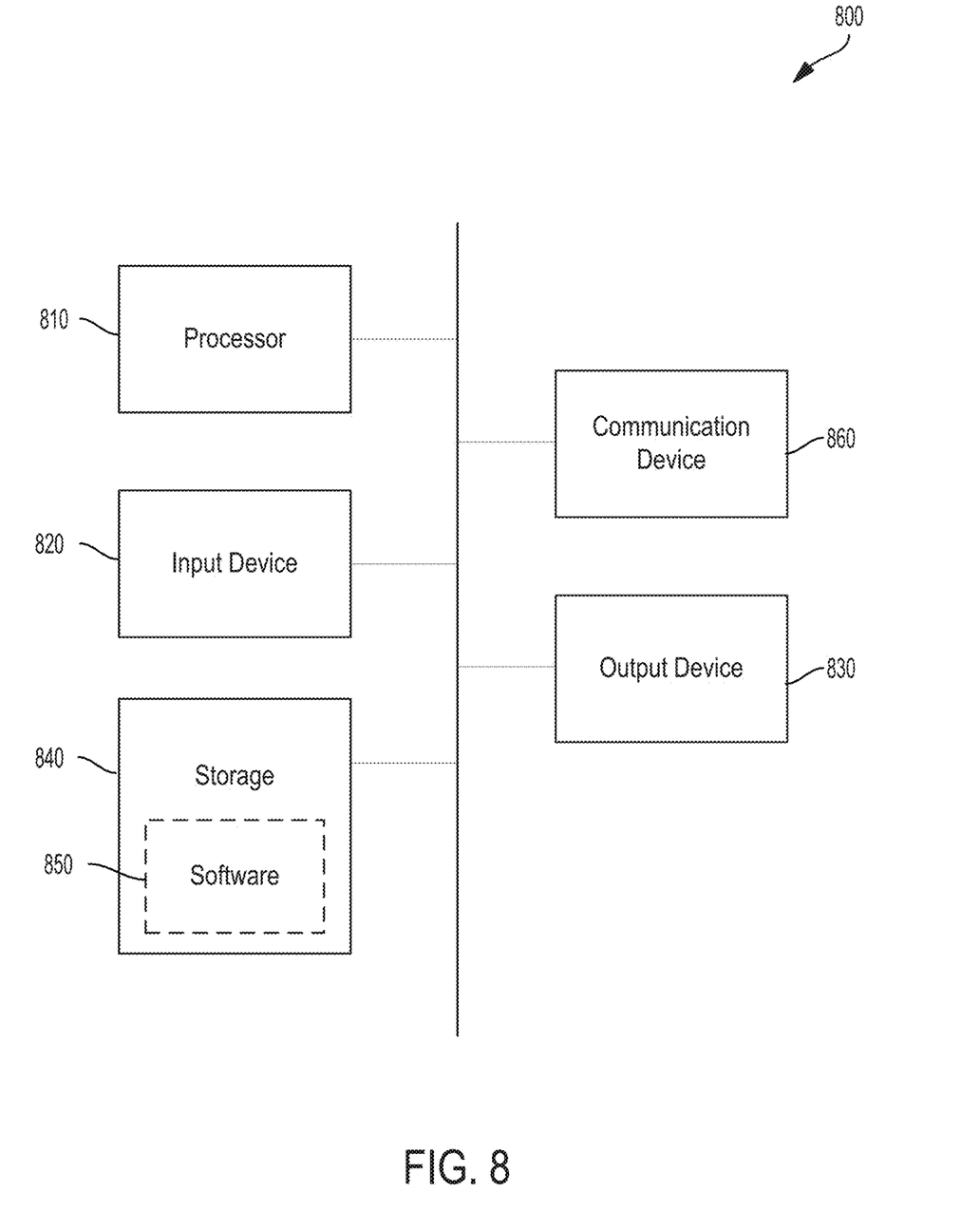
FIG. 8 illustrates an example of a computer, according to some embodiments.

FIG. 8 illustrates an example of a computer in accordance with one embodiment. Computer 800 can be a component of a radar system for identifying airborne and spaceborne objects in a nuclear-scintillated environment according to the systems and methods described above, such as radar system 100 of FIG. 1, or can include the entire system itself. In some embodiments, computer 800 is configured to execute a method for identifying or spaceborne objects in a nuclear-scintillated environment, such as each of methods 600 and 700 of FIGS. 6 and 7, respectively.

Computer 800 can be a host computer connected to a network. Computer 800 can be a client computer or a server. As shown in FIG. 8, computer 800 can be any suitable type of microprocessor-based device, such as a personal computer, workstation, server, or handheld computing device, such as a phone or tablet. The computer can include, for example, one or more of processor 810, input device 820, output device 830, storage 840, and communication device 860. Input device 820 and output device 830 can correspond to those described above and can either be connectable or integrated with the computer.

Input device 820 can be any suitable device that provides input, such as a touch screen or monitor, keyboard, mouse, or voice-recognition device. Output device 830 can be any suitable device that provides an output, such as a touch screen, monitor, printer, disk drive, or speaker.

Storage 840 can be any suitable device that provides storage, such as an electrical, magnetic, or optical memory, including a random access memory (RAM), cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein, such as each of methods 600 and 700 of FIGS. 6 and 7, respectively.

Software 850, which can be stored in storage 840 and executed by processor 810, can include, for example, the programming that embodies the functionality of the present disclosure (e.g., as embodied in the systems, computers, servers, and/or devices as described above). In some embodiments, software 850 can include a combination of servers such as application servers and database servers.

Software 850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

What is claimed is:

1. A method performed by a radar system to detect airborne and spaceborne objects, comprising:
transmitting a plurality of narrowband signals corresponding to a plurality of consecutive segments of a linear frequency modulated (LFM) waveform, wherein each narrowband signal corresponds to a different segment of the plurality of consecutive segments of the LFM waveform;
receiving a plurality of echo signals corresponding to the plurality of narrowband signals being reflected from an airborne or spaceborne object;
processing the plurality of echo signals to generate a plurality of waveform segments;
combining the plurality of waveform segments to produce a composite waveform; and
applying a matched filter to the composite waveform using the LFM waveform to detect the airborne or spaceborne object.

2. The method of claim 1, comprising:
generating a plurality of narrowband waveforms corresponding to the plurality of consecutive segments; and
modulating the plurality of narrowband waveforms by a plurality of corresponding carrier frequencies to produce the plurality of narrowband signals.

3. The method of claim 2, wherein the plurality of carrier frequencies are different from each other.

4. The method of claim 2, wherein each carrier frequency from the plurality of carrier frequencies comprises a frequency in one of the following radar bands: X-band, Ku-band, K-band, Ka-band, or the W-band.

5. The method of claim 2, wherein a narrowband waveform from the plurality of narrowband waveforms corresponds to an LFM segment from the plurality of consecutive segments of the LFM waveform, and wherein modulating the plurality of narrowband waveforms comprises:
generating a carrier frequency to modulate the narrowband waveform by adjusting a base carrier frequency based on a position of the LFM segment with respect to the plurality of consecutive segments.

6. The method of claim 1, wherein an echo signal from the plurality of echo signals corresponds to an LFM segment from the plurality of consecutive segments of the LFM waveform, and wherein processing the plurality of echo signals comprises:
determining a carrier frequency by adjusting a base carrier frequency based on a slope of the LFM waveform and a position of the LFM segment with respect to the plurality of consecutive segments; and
demodulating the echo signal using the carrier frequency to generate a waveform segment from the plurality of waveform segments.

7. The method of claim 1, wherein the plurality of echo signals are demodulated by a plurality of carrier frequencies to produce a plurality of demodulated echo signals, and wherein processing the plurality of echo signals comprises:
generating a plurality of time-shifted echo signals by time shifting the plurality of demodulated echo signals based on characteristics of the plurality of consecutive segments; and
generating the plurality of waveform segments by applying one or more frequency shifts and one or more phase shifts to the plurality of time-shifted echo signals.

8. The method of claim 7 wherein generating the plurality of waveform segments by applying one or more frequency shifts and one or more phase shifts comprises:
applying the one or more phase shifts based on a velocity of the airborne or spaceborne object.

9. The method of claim 1, wherein the airborne or spaceborne object comprises a ballistic missile or an aircraft.

10. The method of claim 1, wherein the plurality of narrowband signals are transmitted on a plurality of corresponding carrier frequencies that are each above a plasma frequency of a nuclear scintillated environment.

11. The method of claim 10, wherein the LFM waveform comprises a bandwidth larger than a correlation bandwidth imposed by the nuclear scintillated environment on signals transmitted in the nuclear scintillated at the plurality of carrier frequencies.

12. A system for detecting airborne and spaceborne objects, comprising:
a transmitter configured to transmit a plurality of narrowband signals corresponding to a plurality of consecutive segments of a linear frequency modulated (LFM) waveform, wherein each narrowband signal corresponds to a different segment of plurality of consecutive segments of the LFM waveform;
a receiver configured to receive a plurality of echo signals corresponding to the plurality of narrowband signals being reflected from an airborne or spaceborne object;
one or more processors;
memory; and
one or more programs, wherein the one or more programs are stored in the memory and configured to be executed by the one or more processors, the one or more programs including instructions for:
processing the plurality of echo signals to generate a plurality of waveform segments,
combining the plurality of waveform segments to produce a composite waveform, and
applying a matched filter to the composite waveform based on the LFM waveform to detect the airborne or spaceborne object.

13. The system of claim 12, comprising:
a waveform generator configured to generate a plurality of narrowband waveforms corresponding to the plurality of consecutive segments, wherein
the transmitter is configured to modulate the plurality of narrowband waveforms by a plurality of corresponding carrier frequencies to generate the plurality of narrowband signals.

14. The system of claim 13, wherein the plurality of carrier frequencies are different from each other.

15. The system of claim 13, wherein each carrier frequency from the plurality of carrier frequencies comprises a frequency in one of the following radar bands: X-band, Ku-band, K-band, Ka-band, or the W-band.

16. The system of claim 13, wherein a narrowband waveform from the plurality of narrowband waveforms corresponds to an LFM segment from the plurality of consecutive segments of the LFM waveform, and wherein to module the plurality of narrowband waveforms, the transmitter is configured to:

generate a carrier frequency to modulate the narrowband waveform by adjusting a base carrier frequency based on a position of the LFM segment with respect to the plurality of consecutive segments.

17. The system of claim 12, wherein an echo signal from the plurality of echo signals corresponds to an LFM segment from the plurality of consecutive segments of the LFM waveform, and wherein to process the plurality of echo signals, the one or more instructions comprise:
- determining a carrier frequency by adjusting a base carrier frequency based on a slope of the LFM waveform and a position of the LFM segment with respect to the plurality of consecutive segments; and
- demodulating the echo signal using the carrier frequency to generate an waveform segment from the plurality of waveform segments.

18. The system of claim 12, wherein the plurality of echo signals are demodulated by a plurality of carrier frequencies to generate a plurality of demodulated echo signals, and wherein to process the plurality of echo signals, the one or more instructions comprise:
- generating a plurality of time-shifted echo signals by time shifting the plurality of demodulated echo signals based on characteristics of the plurality of consecutive segments; and
- generating the plurality of waveform segments by applying one or more frequency shifts and one or more phase shifts to the plurality of time-shifted echo signals.

19. The system of claim 18, wherein generating the plurality of waveform segments by phase and frequency shifting comprises:
applying the one or more phase shifts based on a velocity of the airborne or spaceborne object.

20. The system of claim 12, wherein the airborne or spaceborne object comprises a ballistic missile or an aircraft.

21. A non-transitory computer-readable storage medium comprising one or more programs for detecting airborne and spaceborne objects, wherein the one or more programs, when executed by one or more processors, cause the one or more processors to:
- cause a transmission of a plurality of narrowband signals corresponding to a plurality of consecutive segments of a linear frequency modulated (LFM) waveform, wherein each narrowband signal corresponds to a different segment of plurality of consecutive segments of the LFM waveform;
- receive a plurality of echo signals corresponding to the plurality of narrowband signals being reflected from an airborne or spaceborne object;
- process the plurality of echo signals to generate a plurality of waveform segments;
- combine the plurality of waveform segments to produce a composite waveform; and
- apply a matched filter to the composite waveform using the LFM waveform to detect the airborne or spaceborne object.

22. The non-transitory computer-readable storage medium of claim 21, wherein each carrier frequency from the plurality of carrier frequencies comprises a frequency in one of the following radar bands: X-band, Ku-band, K-band, Ka-band, or the W-band.

* * * * *